US006584319B1

(12) United States Patent
Girod

(10) Patent No.: US 6,584,319 B1
(45) Date of Patent: Jun. 24, 2003

(54) DEVICES ENABLING RADIOTELEPHONES TO MANAGE FILTERING AND INTERFERENCE

(76) Inventor: Raoul Girod, Montagny, 69210 Bully (FR)

( * ) Notice: Subject to any disclaimer, the term of this patent is extended or adjusted under 35 U.S.C. 154(b) by 0 days.

(21) Appl. No.: 09/462,055

(22) PCT Filed: Jul. 1, 1998

(86) PCT No.: PCT/FR98/01411

§ 371 (c)(1),
(2), (4) Date: Jan. 27, 2000

(87) PCT Pub. No.: WO99/01958

PCT Pub. Date: Jan. 14, 1999

(30) Foreign Application Priority Data

Jul. 1, 1997 (FR) .......................................... 97 08546

(51) Int. Cl.[7] .......................................... H04Q 7/20

(52) U.S. Cl. ...................... 455/456; 455/422; 455/74.1

(58) Field of Search ........................... 455/414, 1, 404, 455/401, 567, 421, 456, 432, 410, 411, 412, 26.1, 423, 425, 418, 74.1, 569

(56) References Cited

U.S. PATENT DOCUMENTS

| | | | | | |
|---|---|---|---|---|---|
| 4,752,949 | A | * | 6/1988 | Steinbeck et al. | 455/74.1 |
| 5,224,150 | A | * | 6/1993 | Neustein | 340/7.44 |
| 5,442,805 | A | * | 8/1995 | Sagers et al. | 455/456 |
| 5,898,908 | A | * | 4/1999 | Griffin et al. | 455/127 |
| 6,011,973 | A | * | 1/2000 | Valentine et al. | 455/456 |
| 6,128,485 | A | * | 10/2000 | Mori et al. | 455/422 |

* cited by examiner

*Primary Examiner*—Edward F. Urban
*Assistant Examiner*—Erika A Gary
(74) *Attorney, Agent, or Firm*—Herbert Dubno

(57) ABSTRACT

Radiotelephones react to their presence in filtered or jammed areas by the creation of a filtered mode for its operation or by virtue of direct connections for managing the filtering and the priority cases.

3 Claims, 7 Drawing Sheets

DEVICES ENABLING RADIOTELEPHONES TO MANAGE FILTERING AND INTERFERENCE

CROSS REFERENCE TO RELATED APPLICATIONS

This application is a national stage of PCT/EP 98/01411 filed Jul. 1, 1998 and based upon French application 97 08 546 filed Jul. 1, 1997 under the International Convention.

FIELD OF THE INVENTION

The present invention defines devices and procedures to be included in radiotelephones and in their environment in order to allow them to react correctly to cases of jamming and of filtering.

BACKGROUND OF THE INVENTION

Radiotelephones, which are becoming more and more widespread, have the drawback* of creating an audible nuisance. The current solutions, such as the use of vibrators, solve the problem only incompletely since they assume a deliberate act by the users and are inoperative in the event of forgetfulness or of unwillingness. In order to limit this nuisance, apparatus for filtering and neutralizing portable radiotelephones will be installed in places to be protected: cinemas, trains, etc. Some of this filtering apparatus is described by the patents FR 97 07000, FR 97 10105 and PCT FR 98/01109, and is designated by the term "jammer".

In the texts below we will use the terms filtering and jamming equivalently, whether they are deliberate or accidental, or result from shadow areas.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
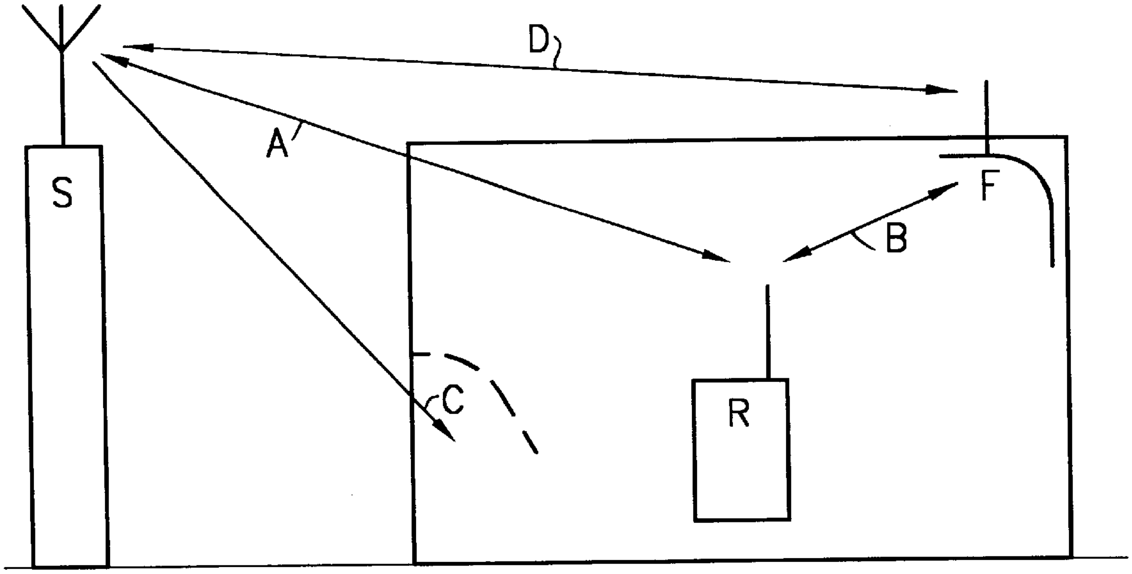
FIG. 1 is a diagram of a system in which a radiotelephone is in a protected space and is subject to jamming or filtering.

FIG. 1 shows a local jamming/filtering system F which prevents the radiotelephone R from establishing a link with the transmitter S, and in particular keeps the radiotelephone from ringing, by virtue of an electromagnetic transmission D which jams the normal link A or emits signals (B, D) which alter the behavior of R or of S (see the above patents).

Figure 2:
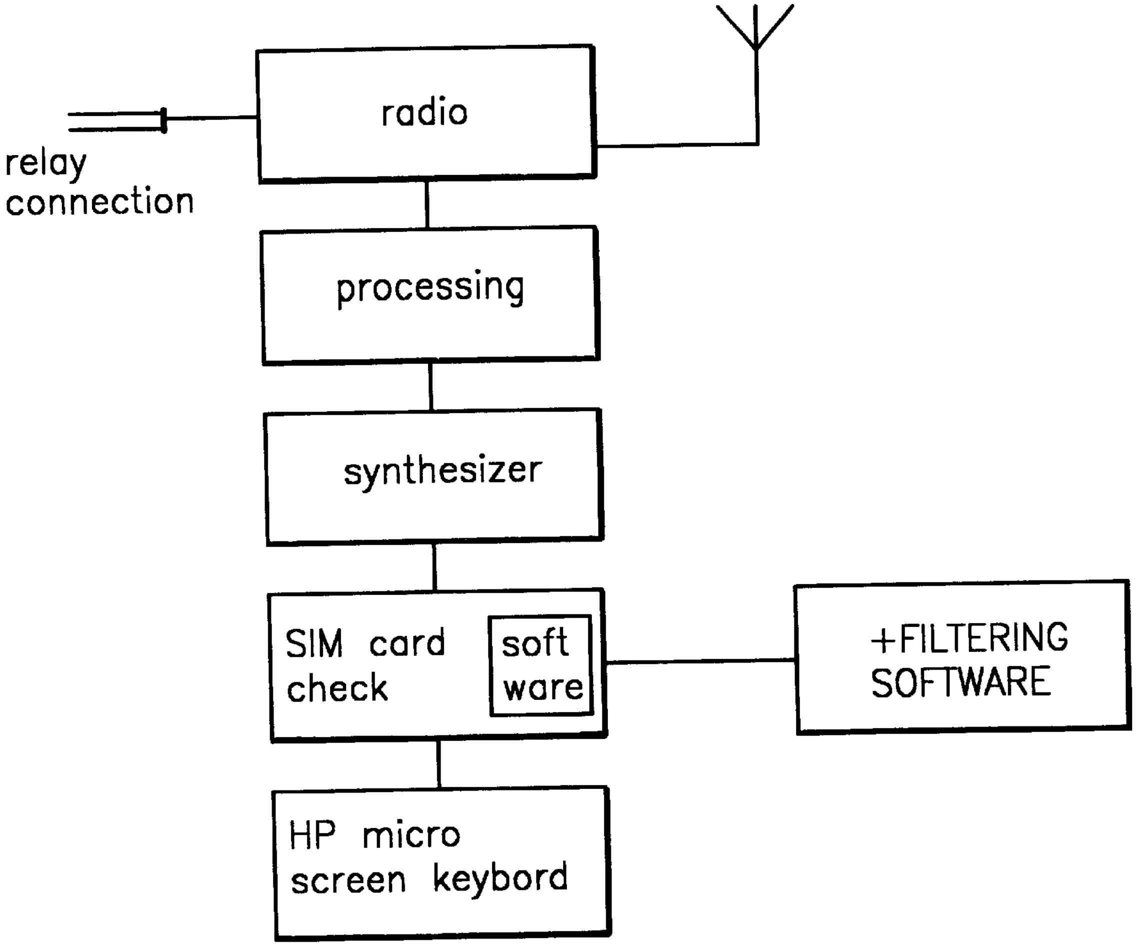
FIG. 2 is a block diagram of a radiotelephone having a radio link within the protected space.
Figure 3:
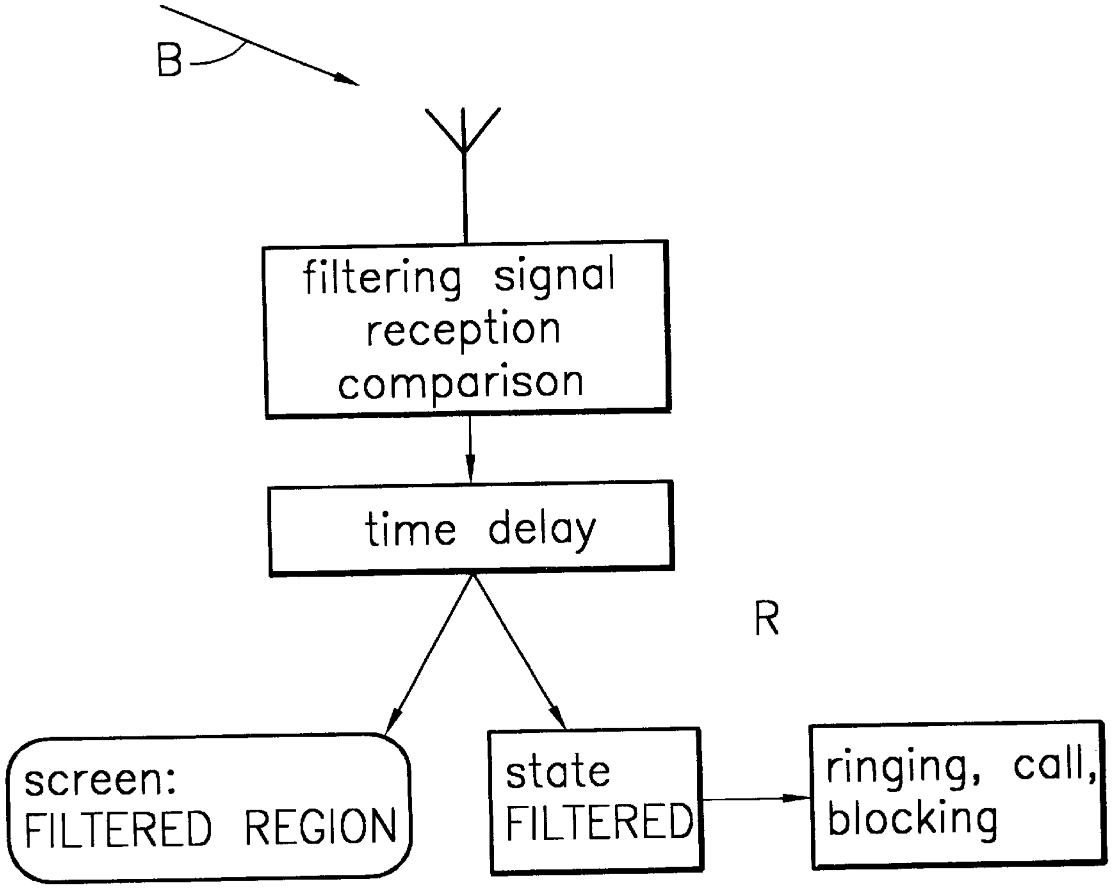
FIG. 3 is a block diagram showing the operation within the protected space.

The present invention is represented by an addition of connections and of software instructions in the radiotelephone R (see FIG. 2) in order to allow it to react correctly to the jamming, in particular, by warning the user of the existence of the jamming; via a message, without ringing, when it is present in a filtered area, and with ringing when it leaves the filtered area and when it has received a call during the period of filtering or when the transmitting station 5 has received a message or a call during this same period.

The apparatus R, made inaccessible by the jamming/filtering should, by virtue of the present invention, detect a call or detect jamming and warn the user without counteracting the jamming, except in certain particular cases described below.

The present invention also comprises means C which allow a controlled radio link to the radiotelephones present in a filtered area. (See relay connection of FIG. 2).

This invention also allows the radiotelephone to communicate with a jammer in order to undertake functions of detection and change of operating mode, in order to mitigate the drawbacks of the jamming for itself or those outside the space. The description of the functionalities and means of the present invention is as follows:

In the filtered area, the apparatus R receives the signal B and recognizes the filtering messages by virtue of its characteristics: frequencies and/or content of the filtering messages.

The changeover into a "filtered" mode by the radiotelephone takes place after a certain time delay to knowing the reception of the first filtering message. This time delay (a few seconds) avoids immediate changeover by a radiotelephone which has passed rapidly into a filtered area, particularly if it was at the limit of the filtered area and if the jamming transmissions exceeded the strict limit of the space to be protected. The apparatus R, at the moment when it changes over into a "filtered" mode, displays a message on its screen: "FILTERED AREA". This silent alert makes it possible to warn an attentive user and can impel him to leave the filtered area if he so desires. A flashing light signal is an option.

Figure 4:
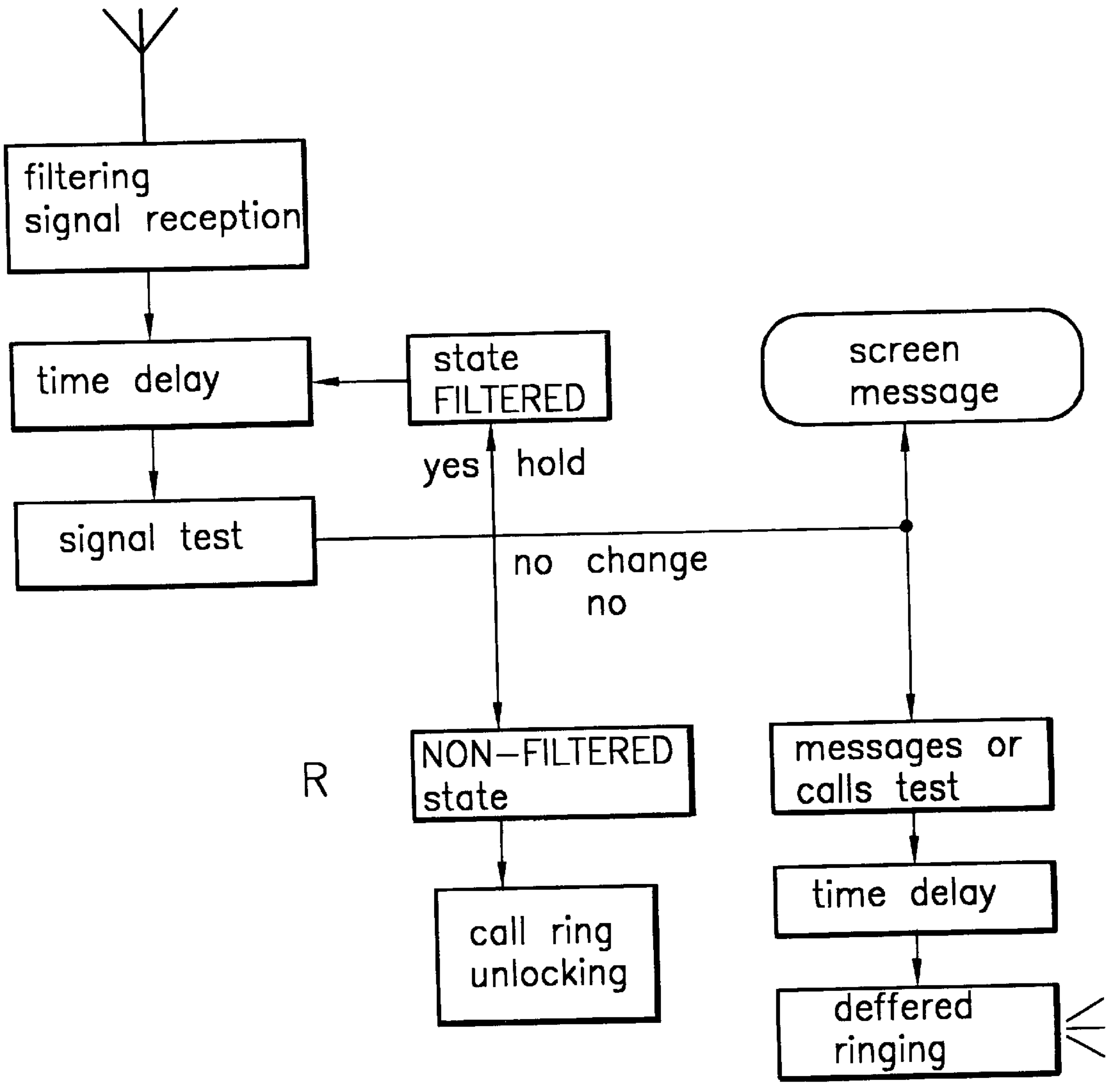
FIG. 4 is a block diagram showing the operation outside the protected space.

Upon exit from the filtered area; FIG. 4, periodically, in the filtered mode, the apparatus R tests the reception of the signals after a time delay. If it detects a filtering message, it remains in the "filtered" mode. Otherwise it changes over into normal mode and tests for the existence of messages or of calls received since it changed over into "filtered" mode.

If the test is positive, it warns the user after a certain time delay (a few seconds or tens of seconds). This case is that of permanent jamming. This time delay is for 2 purposes: to avoid unblocking as a result of a passage into an area of shadow for the jamming waves, and to avoid an accumulation of ringings at the exit from a jammed area.

To do that, it receives the indication of a message received and stored in the messaging service of the transmitter station S (possibly with the number of the caller).

It displays the message-received sign normally on its screen (functionality existing prior to the present invention). The behavioral aspects defined in the present 25 invention are as follows:

Minimum Behavior: Deferred Ringing

The radiotelephone rings (or vibrates) in order to warn the user of the existence of a call during the filtered period. Ringing therefore occurs, in the present invention, at a point deferred in time after the exit from the filtered area. This special deferred ringing has the advantage of mitigating the drawbacks of the filtering and avoids frequent consultation of the screen by the user.

Figure 5:
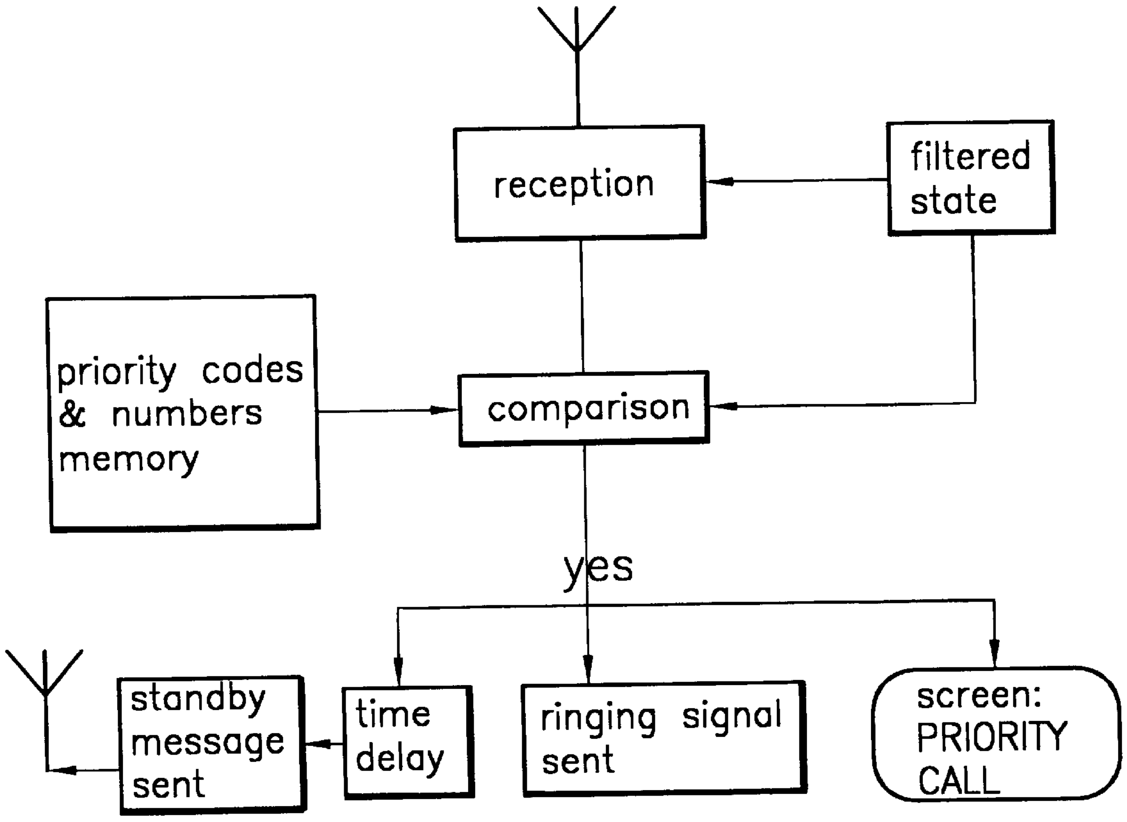
FIG. 5 is a block diagram showing the handling of priority call.

Supplementary Options:

1—Priority callers: see FIG. 5

The present invention provides for priority calling codes or numbers to be recorded in memory: police stations, for example. If the filtered call corresponds to one of these numbers, the apparatus, in a filtered area, will emits a special signal (brief and discreet ringing or vibration) which will encourage the user to leave the filtered area, possibly keeping contact with the caller by virtue of a standby message and with a display on the screen. This option is facilitated with janming apparatus F which establishes a dialogue with the radiotelephone R or the station S at the moment of the jamming. The numbers in memory will be of two types:

- pre-recorded or contained in the transmitters 15 S or F.
- input by the user in limited numbers: (children for example). In this case the warning signal will be even more discreet, in order to keep the priority with filtering of the area and the reduction in sound pollution. In both cases, conversation remains impossible in the filtered area, except if special soundproofed areas have been set aside.

Figure 6:
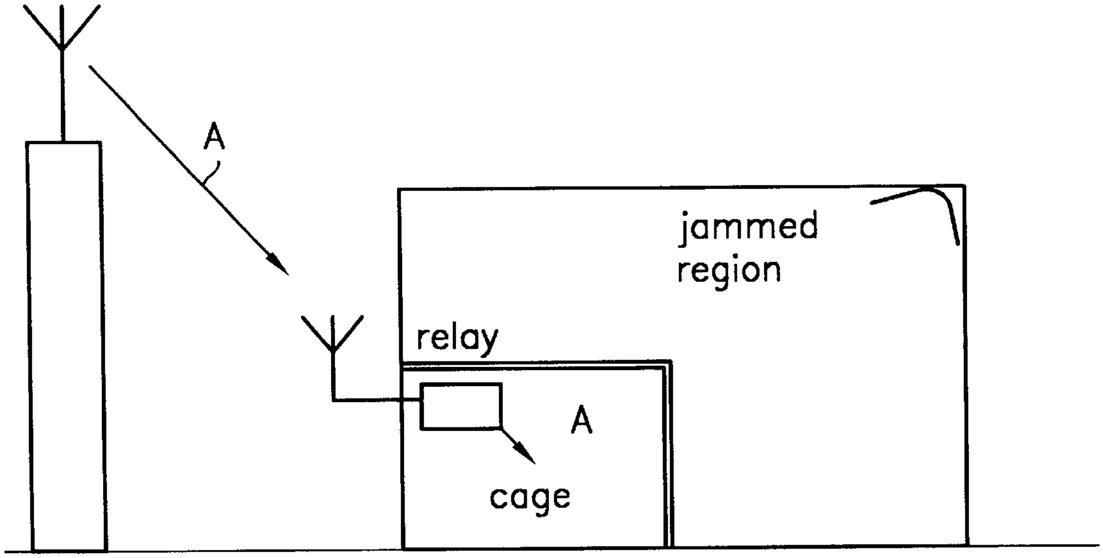
FIG. 6 is a diagram showing a cage within the jammed region.
Figure 8:
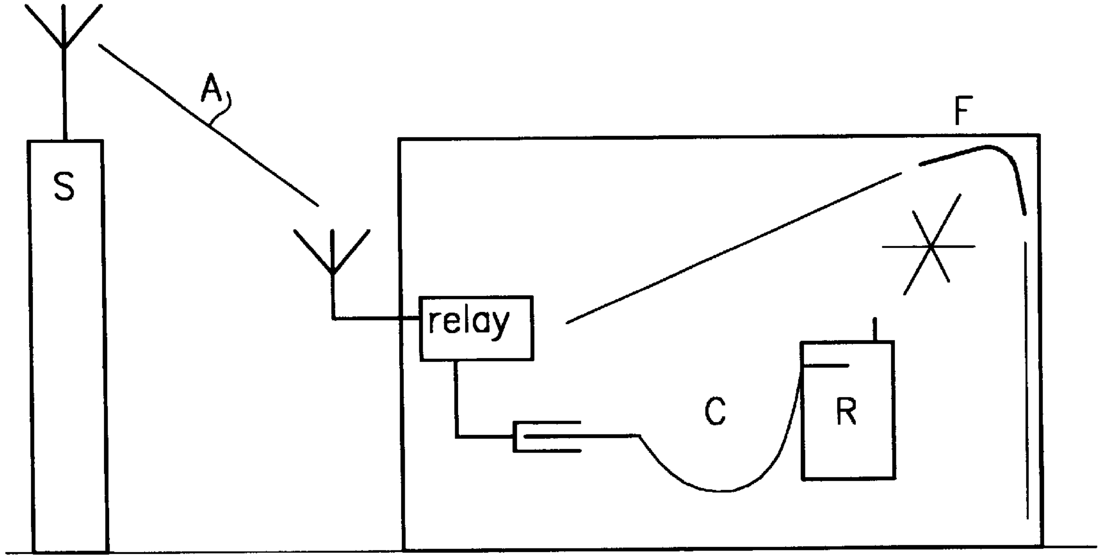
FIG. 8 is a diagram showing a protected space in which there is a cable connection between the radiotelephone and the antenna.

2—Unjammed cages: see FIGS. 6 and 8.

According to the present invention, Faraday 25 cages are envisaged within a filtered space, in order to escape from the jamming. They have an external aerial for picking up communications, with transfer into the cage in order to allow normal links (relays). The technology for the construction of these relays is known although not currently used in the case of jamming.

An electrical connection with the radiotelephone can be also envisaged to provide a normal link. In this latter case, the "cage" is not necessarily isolated electromagnetically. See FIG. 8.

Connecting the radiotelephone to this socket disconnects the antenna of the radiotelephone, and establishing direct contact with the circuits which are operating normally. Certain radiotelephones already possess connecting sockets used for vehicle antennas. The present invention envisages using them to avoid the jamming, in a controlled way and in well-defined places (passenger seats, cabins, etc.). These connections or links can be installed in places or buildings in which radio links are poor, impossible or dangerous.

Figure 7:
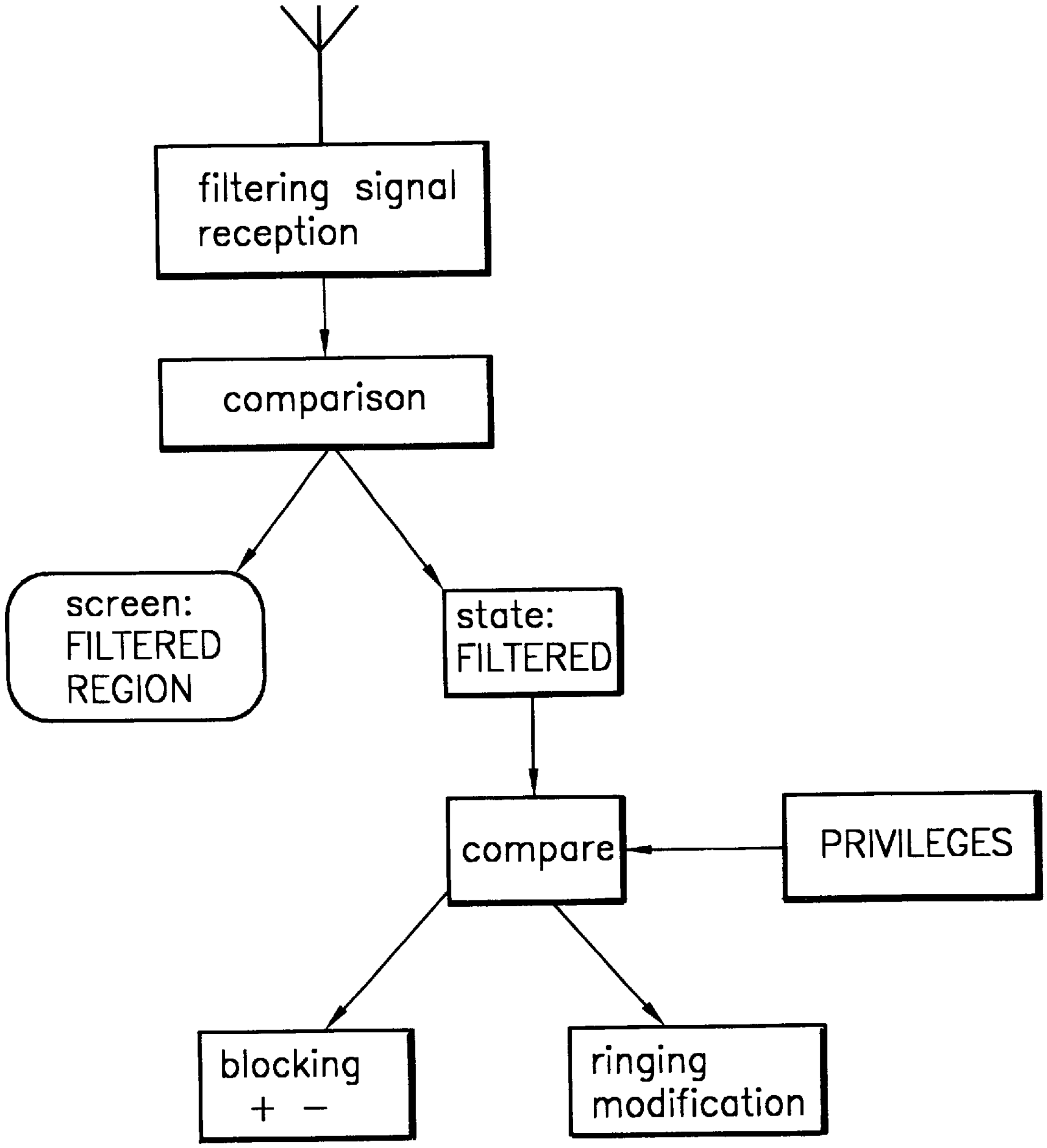
FIG. 7 is a block diagram again showing the effect of privileges.

3—Privileged subscribers: see FIG. 7:

Exceptions to the call blocking and to the filtering could exist for certain numbers and/or professions (doctors, etc.). These exceptions could not be decided on by the user but obtained at the time of the subscriber connection. Certain types of "privileged" subscriber connections could be connected with special authorizations. The information in memory, different from the current case, gives the capability of sending a special code and/or the capability of emitting a particular ringing even in a filtered area, and of doing so with 4 levels of operation, namely, response possible or otherwise, and call possible or otherwise A variant of the invention as a whole described above uses the capabilities of the transmitting stations. The software associated with the transmitting stations can incorporate some of the logic functions described above.

The transmitting station detects the jamming code via the jammer or the radiotelephone identified. In this case, it takes over the task of managing filtered radiotelephones with procedures equivalent to those described above in the present invention.

In one complete configuration, the functionality and software distributed among the 4 items of equipment transmitters, receivers, jammers, cages+relays ensure coordination of the dialogues among these 4 items of equipment according to the logic of diagrams 3, 4, 5 and 7.

The original combination of these means, known or unknown, allows a minimum number of functions for radiotelephones in order to mitigate the rigidity of the jamming.

Variants of the present invention will be chosen on the basis of the types of jamming used (volumetric, detection at passages, permanent, intermittent, etc.) in accordance with the operators' constraints. The use of a radiotelephone in "filtered" mode could be deliberate, outside a filtered area, by users not wishing to be disturbed but only alerted. In this case, return to normal mode is possible and triggered by the user.

The "filtered" mode is thus halfway between the switched-on mode and the switched-off mode, with two cases: deliberate or imposed. The present invention is thus supplementary to that of jammers and allows more flexible management of the filtering of radiotelephones in the areas where their sound pollution is undesirable.

This management of the filtering will allow operators and manufactures of radiotelephones to offer supplementary services to their customers.

What is claimed is:

1. In combination with a radiotelephone, a device comprising:

- detection means for detecting that the radiotelephone is present in an area of jamming or of filtering;
- switchover means for changing over between a normal operating mode of the radiotelephone and a filtered mode, in response to a signal received from said detection means, the switchover means comprising;
  - means for displaying on the screen, when the radiotelephone is operating in filtered mode, a message indicating that the radiotelephone is in an area of jamming, and for displaying on the screen a message and/or for emitting a flashing signal indicating that a call is occurring in the jamming area; and
  - means for emitting a sound signal, when the radiotelephone is operating in normal mode, upon exit from the jamming area if a message or a call occurred in the jamming area; and
- a link formed by an electrical cable between an antenna outside the filtered or jammed area and a connecting socket of the radiotelephone, with the radio reception of the antenna of the radiotelephone being cut off while said radiotelephone is in said jammed area.

2. The combination defined in claim 1 wherein the switchover means for changing over into filtered mode operate for different types of jamming or filtering including volumetric, detection at passages, permanent and intermittent.

3. A radiotelephone comprising:

- a receiving antenna for receiving radio signals from a transmitting antenna outside a protected area in a jamming environment, radio reception by said receiving antenna being cut off inside said protected area; and
- a link formed by an electric cable between said transmitting antenna and a connecting socket of said radiotelephone while said radiotelephone is in said protected area.

* * * * *